June 27, 1933.    C. D. CARLETON ET AL    1,915,402
BATTERY PLATE FEEDER
Filed Jan. 29, 1932    4 Sheets-Sheet 1
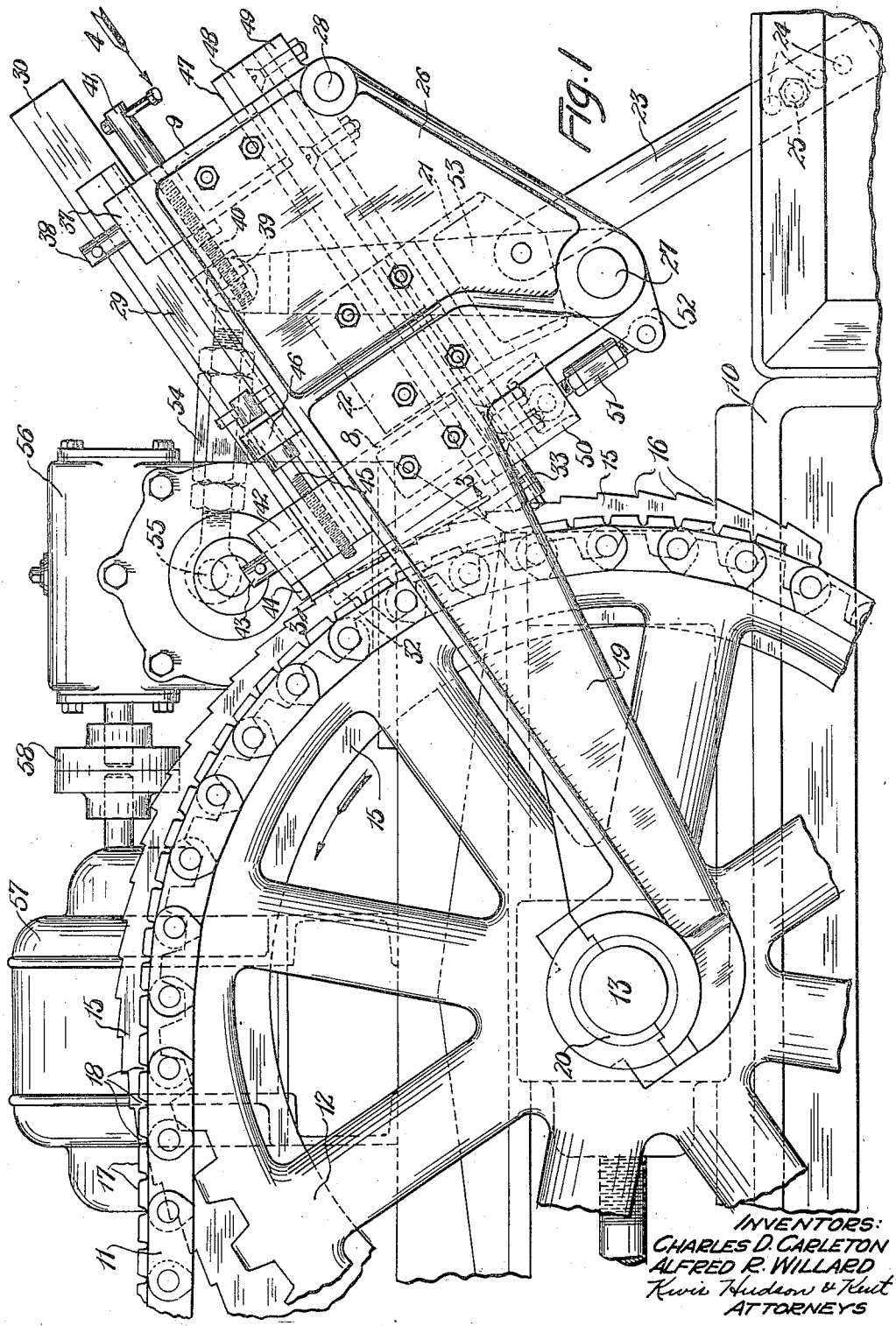
INVENTORS:
CHARLES D. CARLETON
ALFRED R. WILLARD
Kwis Hudson & Kent
ATTORNEYS June 27, 1933.   C. D. CARLETON ET AL   1,915,402
BATTERY PLATE FEEDER
Filed Jan. 29, 1932   4 Sheets-Sheet 2
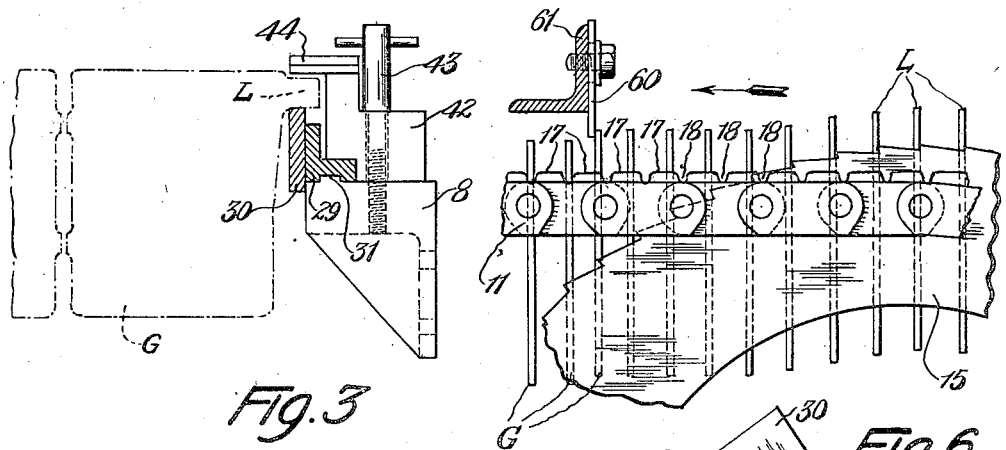
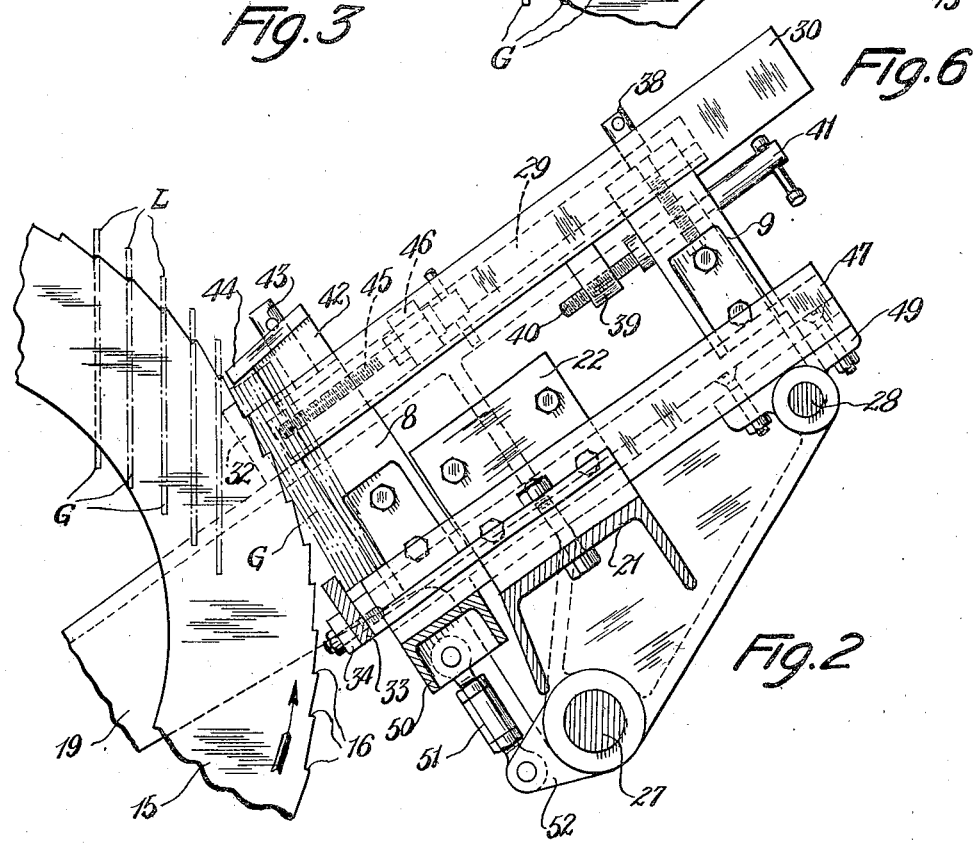
INVENTORS:
CHARLES D. CARLETON
ALFRED R. WILLARD
ATTORNEYS June 27, 1933.  C. D. CARLETON ET AL  1,915,402
BATTERY PLATE FEEDER
Filed Jan. 29, 1932    4 Sheets-Sheet 3

INVENTORS
CHARLES D. CARLETON
ALFRED R. WILLARD
ATTORNEYS

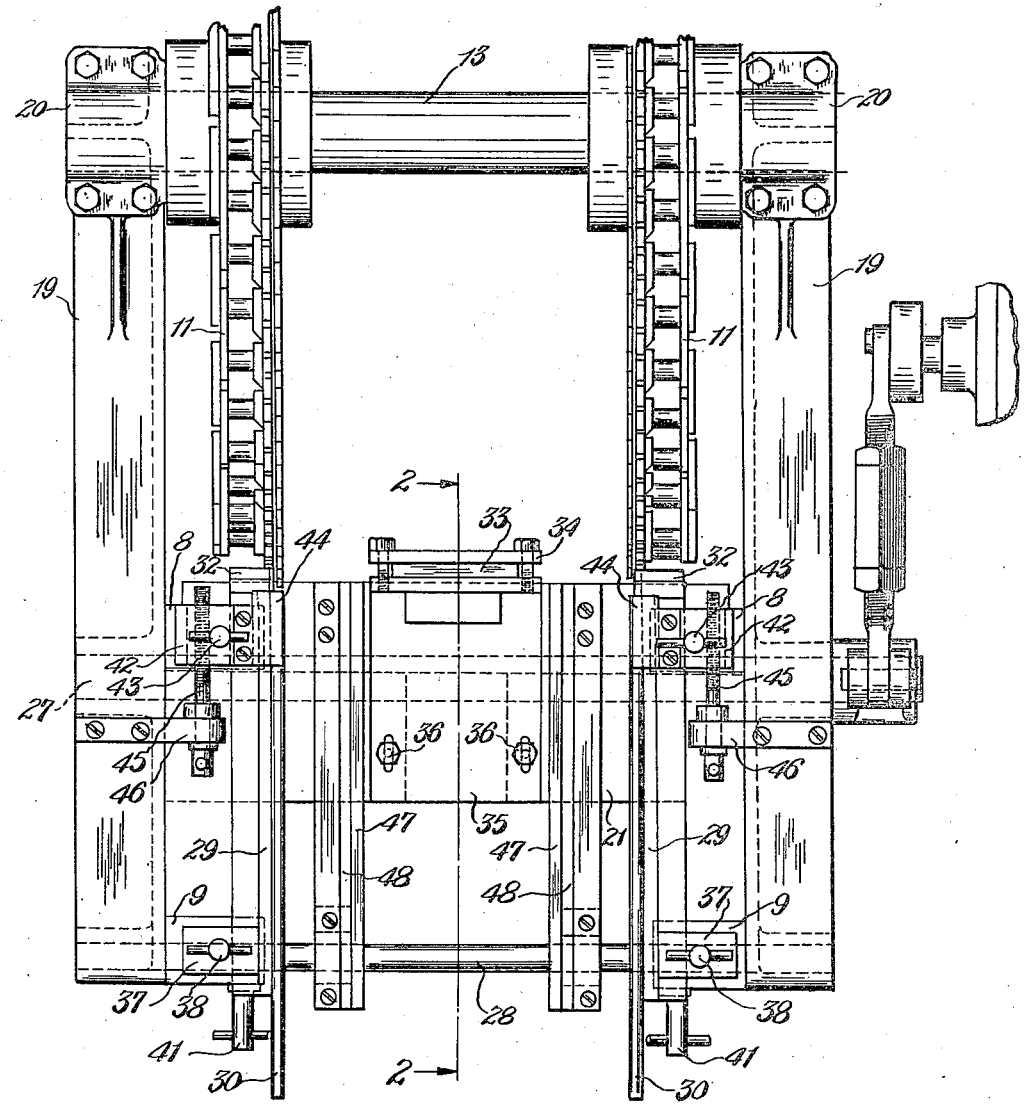

Patented June 27, 1933

1,915,402

UNITED STATES PATENT OFFICE

CHARLES D. CARLETON, OF CLEVELAND, AND ALFRED R. WILLARD, OF EAST CLEVELAND, OHIO, ASSIGNORS TO WILLARD STORAGE BATTERY COMPANY, OF CLEVELAND, OHIO, A CORPORATION OF WEST VIRGINIA

BATTERY PLATE FEEDER

Application filed January 29, 1932. Serial No. 589,658.

This invention relates to improvements in battery plate feeders, being designed primarily although not exclusively for use in connection with plate or grid carriers for conveying the same through drying ovens.

One of the objects of the invention is the provision of means for transferring double plates or grids from a magazine onto a conveyor in evenly spaced relation.

Another object is the provision of a mechanism of this character which shall lessen the manual labor required in the handling of grids.

Other objects and features of novelty will appear as we proceed with the description of that embodiment of the invention which, for the purposes of the present application, we have illustrated in the accompanying drawings, in which Figure 1 is a side elevational view of a fragment of a grid conveyor with our new feeder applied thereto.

Fig. 2 is a fragmental vertical section taken substantially on the line 2—2 of Fig. 5.

Fig. 3 is a sectional detail view of a portion of the feeder, the view being taken substantially on the line 3—3 of Fig. 1.

Fig. 5 is a plan view, and

Fig. 6 is a detail elevational view illustrating a means for pushing the grids into the chain notches.

Figure 4:
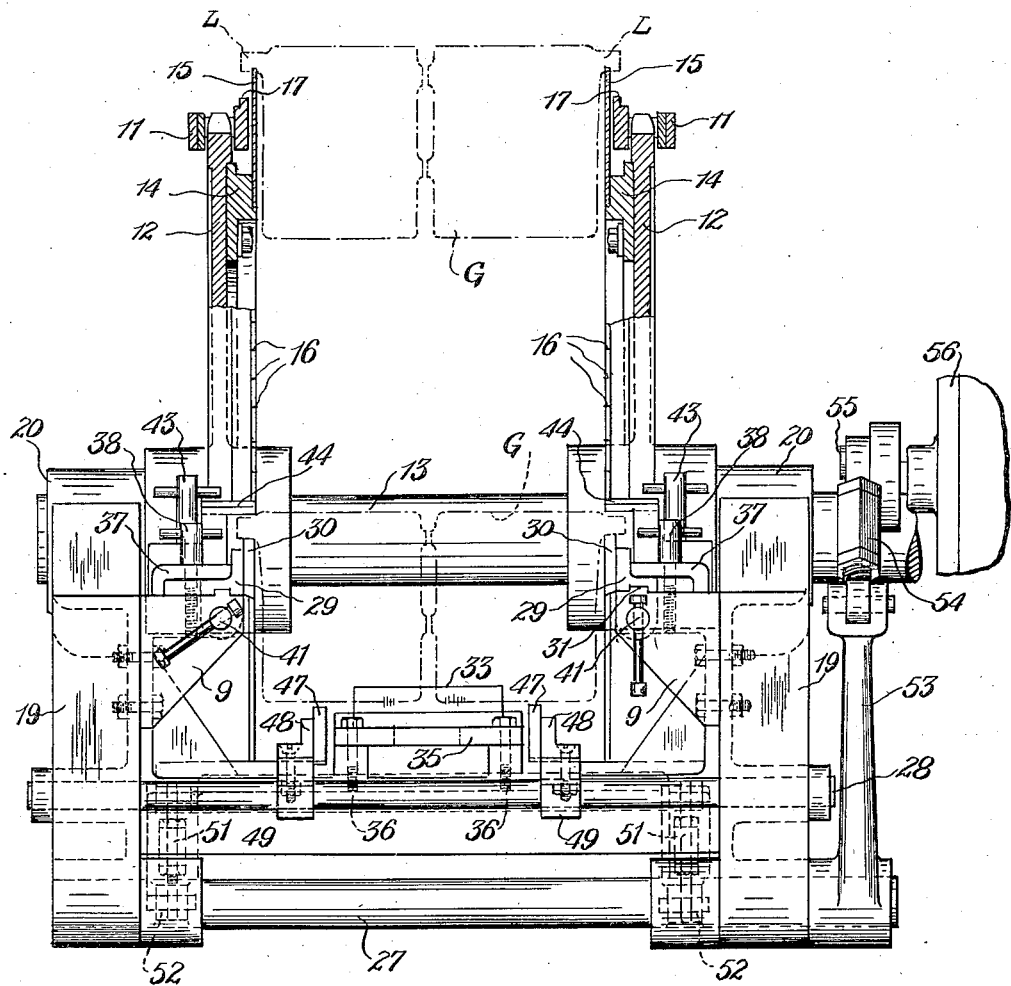
Fig. 4 is an end view looking substantially in the direction of arrow 4 in Fig. 1, and showing a portion of the carrier in transverse section.

In the drawings we have indicated at 10 a fragment of the frame for a grid carrier comprising a pair of endless conveyor elements 11 which, in this case, are chains. At the end of the carrier shown herein these chains run over sprocket wheels 12, which are mounted about the same axis to turn together. To this end they may be secured in properly spaced relation to a shaft 13, having suitable bearings in the frame of the carrier.

To the inner sides of the spokes of the sprocket wheels 12 we attach blocks 14, to which are welded or otherwise secured flat rings or wheels 15, spaced from the chains 11 just far enough to clear the same, and projecting radially outward beyond the sprockets and beyond the chains where they run upon the sprockets. The peripheries of these rings or wheels 15 are formed with projections 16, similar in shape to the projections on a ratchet wheel. The projections face forward with respect to the direction of rotation of the wheels, and are spaced apart a distance about equal to the height of a grid lug. The upper runs of the chains 11 in this instance are intended to travel through a drying oven, but obviously the feeder of the present invention could be employed in connection with grid carriers or conveyors having different specific uses, and in fact the feeder may be employed for articles other than battery grids where such articles are provided with lateral projections which can be caused to ride upon the projections of the wheels 15 and upon the conveyor chains.

The inner links of the conveyor chains are built up somewhat above the outer links to provide lands 17 that are adapted to support the lugs L of the double grids, the latter being indicated at G in the drawings. Adjacent lands 17 are separated by notches 18 which are of a width just great enough to enable the notches to loosely receive the lugs L on edge. They are spaced apart substantially the same distance as the projections 16, see Fig. 1.

The sprocket wheels 12 turn in the direction indicated by the arrow in Fig. 1, and may be driven by any suitable means, or they may operate as idlers, driving power being applied to the conveyor at its opposite end (not shown).

The grid magazine is positively attached to the grid carrier, being mounted upon a pair of arms 19 provided with split bearings 20 which are clamped about the shaft 13 on the outer sides of the sprocket wheels 12, so that the shaft may turn freely therein. These side arms 19 are connected together by suitable cross braces, as for instance, by an inverted channel-shaped casting 21 having upwardly extended flanges 22 near its extremities which are bolted to the arms 19. A supporting bar 23 may be pivotally connected with the cross brace 21, and may have therein a series of bolt holes 24, through any one of which a bolt 25 mounted in the frame may be caused to extend, whereby the magazine is supported in any one of a series of different inclined positions. The arms 19 have depending portions 26 at their outer ends, in which are mounted rotatably two shafts 27 and 28.

Attached to the inner sides of each of the arms 19 are two brackets 8 and 9, upon the upper surfaces of which we mount a slide 29 to which is rigidly connected a grid supporting rail 30, these rails being spaced apart the proper distance to receive between them the major portion of the grids G, as shown clearly in Fig. 4. The slides 29 and the brackets 8 and 9 are preferably formed with tongue and groove sliding connections 31, as indicated particularly in Figs. 3 and 4. On the forward end of each of the slides 29 there is an inwardly projecting stop 32 which limits the downward travel of the upper ends of the grids in the magazine. The downward travel of the lower ends of the grids is limited by a bottom stop 33, which is a plate adjustably mounted in a clamp 34 that is carried at the forward end of a flat support 35 adjustably mounted by means of fastenings 36 in the cross brace 21. By this means therefore the bottom stop may be advanced or retracted to a limited extent.

The slide 29 may be locked in place by means of the clamp 37, which is held by a shouldered pin 38 that is threaded into the bracket 9. The slide 29 between the brackets 8 and 9 is provided with a depending threaded ear 39 which receives a screw 40 on the end of a pin 41 that is rotatably mounted in bracket 9. When clamp 37 is loosened by unscrewing pin 38, pin 41 may be turned in either direction to advance or retract slide 29 and thereby the stop 32 at the forward end of that slide.

Upon each of the brackets 8 we mount a slide block 42 which is adapted to be clamped in position by a shouldered pin 43 that extends through a slot in the block and is threaded into the bracket 8. The block carries a top stop 44 which terminates at the forward end of the magazine just behind the position of the foremost grid (see particularly Fig. 2) and therefore prevents more than one grid at a time from being drawn out of the magazine. In order to adjust this top stop accurately the block 42 is threaded to receive an adjusting screw 45, the shank of which is rotatably mounted in a bracket 46 attached by suitable means to the adjacent arm 19. The block 42 serves not only as a means for carrying the top stop 44, but also as a clamp for the forward end of slide 29. Hence the clamping pin 43 must be loosened before either one of the adjusting screws 41 or 45 may be turned.

In order to insure travel of the grids forward in the magazine each time a grid is removed from the forward end thereof, we provide means for raising the grids slightly at frequent intervals, so that the lugs L rise above the rails 30 and consequently do not become lodged or stuck thereon. To this end we employ a pair of bottom or "jogger" rails 47, which are arranged in parallelism below the grids G. These rails 47 are attached to angle bars 48. At their rear extremities the latter bars are secured to shaft 28 by means of clamps 49 or the like. The rails 47 terminate short of the bottom stop 33 at the forward end of the magazine, and hence do not affect the two or three foremost grids. The forward ends of the bars 48 are attached to a transverse inverted channel member 50. This channel member is raised and lowered by means of adjustable connecting rods or links 51, that are pivotally joined to cranks 52 secured to the rock shaft 27 just within the side arms 19. On one end of the shaft 27 there is secured a crank arm 53, to the outer extremity of which is pivotally connected an adjustable link 54 that is mounted upon an eccentric pin 55 rotated by the driven shaft of a reducing gear mounted within a gear box 56. Power may be furnished to the reducing gear by an electric motor 57 through a flexible coupling 58, the motor 57 being mounted upon any suitable framework. It will be obvious that as the eccentric pin 55 travels in its circular path, the link 54 will swing the crank arm 53 back and forth, which will in turn cause the crank 52 to impart raising and lowering motion to the channel member 50 through the link 51. The rails 47 therefore will lift the grids off the rails 30 and lower them quickly, the lugs L striking the rails 30 sharply, so that a jarring or "jogging" movement is imparted to the grids, tending to keep them in close engagement and to prevent their sticking to the rails 30. Although the grids are washed before being placed in the magazine, more or less weak acid adheres to them and gets onto the various parts of the magazine, and applicants have discovered that it is impossible to maintain a smooth slippery surface on the magazine rails. Hence, without the jogging mechanism, the grids could not be moved satisfactorily through the magazine. The speed of movement of the jogging mechanism may be varied more or less, and need have no timed relation with the movements of the grid carrier. However we prefer that the time interval between jarring or jogging impulses shall be at least no greater than the time interval between the removal of two consecutive grids from the magazine.

In Fig. 6 we have illustrated the means we employ for lowering the grids from the lands 17 of the endless chains into the notches 18 between the lands. This consists merely of a stop 60 mounted upon a cross-piece 61 of the carrier frame and adjusted vertically to such a height that the depth of engagement between the stop 60 and the lugs L of the grids shall be a trifle less than the depth of the notches 18. Hence, when a grid drops into a given pair of notches 18, its upper edge descends below the level of stop 60, and the grid is enabled to pass below the stop. In this manner each of the grids is pushed into a pair of opposed notches, and thereby the grids are evenly spaced apart and held in such spaced relation throughout their travel on the conveyor.

In the operation of the machine, a workman loads the magazine by placing in it a stack of grids with their lugs resting upon the rails 30, and he must replenish the supply of grids frequently during the operation of the machine. The jarring mechanism causes them to move downwardly along the rails 30. The foremost grid of the stack is always in engagement with the upper and lower stops 32 and 33, which are so adjusted that the foremost grid takes substantially the position shown in Fig. 2. As the wheels 15 turn in the direction of the arrow in that figure, a pair of projections 16 engage beneath the lugs of the foremost grid and lift it off the rails 30 past the top stops 44. As soon as the grid progresses a short distance along its upward travel upon the wheels 15, its lower edge is released from the bottom stop 33, and the grid then swings into vertical position. The top stop 44 is so adjusted that if there is any tendency for the second grid to stick to the foremost one, it is broken loose by the stop 44, which prevents the lifting of more than one grid at a time. Shortly after each grid is carried by the wheels 15 beyond the top center point of the wheels, the perimeters of the wheels cross the line of travel of the upper runs of the chains 11, and the grids are deposited upon the chains, generally upon the lands 17 thereof, as indicated in Fig. 6. They may be permitted to remain in such position throughout their travel upon the chains if desired, but we prefer to brush them off the lands into the notches 18 by the use of stop 60, as previously explained.

By the use of the mechanism herein disclosed it is possible to load a grid carrier much more rapidly than can be done by hand, while at the same time maintaining very accurate spacing of the grids, so that the carrier may be operated at a greater rate of speed and its production materially increased.

Having thus described our invention, we claim:

1. In combination, a magazine for the reception of articles on edge provided with projecting lugs extending laterally, a pair of members mounted on a horizontal axis in front of said magazine, said members being spaced apart a distance corresponding substantially to the distance between the lugs, said members having peripheral indentations adapted to receive the lugs of the articles as the adjacent edges of said members travel upwardly, whereby the articles hang vertically after clearing the magazine, and a conveyor onto which said members deposit the articles as the latter descend with the downgoing side of said members.

2. In combination, a magazine for the reception of articles on edge provided with projecting lugs extending laterally, a pair of members mounted on a horizontal axis in front of said magazine, said members being spaced apart a distance corresponding substantially to the distance between the lugs, said members having peripheral projections adapted to receive the lugs of the articles as the adjacent edges of said members travel upwardly, whereby the articles hang vertically after clearing the magazine, and a conveyor comprising spaced members adapted to receive the lugs of the articles permitting the same to hang vertically and on which said members deposit the articles as the latter descend with the downgoing side of said members.

3. Mechanism for transferring articles having lateral extensions from a magazine onto a travelling carrier which comprises a pair of wheels mounted on a horizontal axis and provided with peripheral projections in which said extensions are adapted to rest, said wheels being so positioned with respect to the magazine as to enable the projections to withdraw articles one at a time therefrom as they advance on the up-going side of the wheels, the carrier at its receiving end being centered about the vertical plane halfway between said wheels and being adapted to receive said articles on the down travel of the said projections.

4. In combination, a magazine for the reception of battery grids on edge with their lugs extending laterally, a pair of wheels mounted on a horizontal axis in front of said magazine, said wheels being spaced apart a distance corresponding to the distance between the lugs, said wheels having peripheral projections adapted to engage said lugs and lift the grids out of said magazine as the adjacent edges of the wheels travel upwardly, whereby the grids after clearing the magazine hang vertically, and a conveyor onto which said wheels deposit the grids as the latter descend with the down-going sides of the wheels.

5. In combination, a magazine for the reception of battery grids on edge with their lugs extending laterally, a pair of wheels mounted on a horizontal axis in front of said magazine, said wheels being spaced apart a distance corresponding to the distance between the lugs, said wheels having peripheral projections spaced apart a distance less than the depth of a grid and adapted to engage said lugs and lift the grids out of said magazine as the adjacent edges of the wheels travel upwardly, whereby the grids after clearing the magazine hang vertical in overlapping relation, and a conveyor onto which said wheels deposit the grids as the latter descend with the down-going sides of the wheels.

6. In combination, a magazine for the reception of battery grids on edge with their lugs extending laterally, means for moving the stack of grids in the magazine toward its delivery end as each grid is removed therefrom, a pair of wheels mounted on a horizontal axis in front of said magazine, said wheels being spaced apart a distance corresponding approximately to the distance between the lugs, said wheels having peripheral projections adapted to engage said lugs and lift the grids out of said magazine as the adjacent edges of the wheels travel upwardly, whereby the grids after clearing the magazine hang vertical, and a double chain conveyor the upper runs of which are in a plane cutting the upper down-going quadrants of said wheels, the chains lying adjacent the wheels, whereby the grids are deposited upon said conveyor as they travel with said down-going quadrants.

7. In combination, a shaft, a pair of sprocket wheels attached thereto in spaced relation, an endless conveyor comprising a pair of chains running over said sprockets, a pair of wheels of a diameter greater than that of the sprockets mounted to turn with said sprockets and having projections extending outwardly from their peripheries, means for depositing articles having lateral extensions onto said projections as they travel through the up-going upper quadrant of their cycle, whereby said articles are deposited upon the chains as the wheels descend on their downward travel past the level of the chains.

8. In combination, a shaft, a pair of sprocket wheels attached thereto in spaced relation, an endless conveyor comprising a pair of chains running over said sprockets, a pair of wheels attached to the sprockets and projecting radially therebeyond, and having projections extending outwardly from their peripheries, means for depositing battery grids upon said wheels with the lugs of the grids resting upon the projections of the wheels as the latter move through the up-going upper quadrant of their cycle, whereby said grids are deposited upon the chains as the wheels descend on their downward travel past the level of the chains.

9. In combination, a shaft, a pair of spaced wheels mounted thereon to turn therewith, having projections extending outwardly from their peripheries, a grid magazine having forwardly projecting arms provided with bearings centered about the axis of rotation of said wheels, said arms extending diagonally upward from their bearings, a grid magazine mounted upon said arms and adapted to deliver grids onto the projections of said wheels as the latter move upwardly past the magazine, a carrier onto which said grids are delivered as the projections upon which they are positioned travel downwardly beyond the tops of the wheels, and means for making magazine adjustments toward and away from said wheels.

10. In combination, a shaft, a pair of spaced wheels mounted thereon to turn therewith, having projections extending outwardly from their peripheries, a grid magazine having forwardly projecting arms provided with bearings centered about the axis of rotation of said wheels, said arms extending diagonally upward from their bearings, a grid magazine mounted upon said arms and adapted to deliver grids onto the projections of said wheels as the latter move upwardly past the magazine, a carrier onto which said grids are delivered as the projections upon which they are positioned travel downwardly beyond the tops of the wheels, and means for securing said arms in various positions of adjustment about said axis to vary the angular relation of the magazine to the said wheels.

11. In combination, a shaft, a pair of spaced wheels mounted thereon to turn therewith, having projections extending outwardly from their peripheries, a grid magazine having forwardly projecting arms provided with bearings centered about the axis of rotation of said wheels, said arms extending diagonally upward from their bearings, a grid magazine mounted upon said arms and adapted to deliver grids onto the projections of said wheels as the latter move upwardly past the magazine, a carrier onto which said grids are delivered as the projections upon which they are positioned travel downwardly beyond the tops of the wheels, and a vibrator adapted to jar the grids in the magazine so as to cause them to slide down toward the delivery end of the magazine.

12. A magazine for battery grids, comprising a pair of rails set on an incline and adapted to support the lugs of the grids, a bottom stop for the foremost grid, a pair of upper stops for the foremost grid fixed to said rails, a pair of top stops adapted to prevent the removal of more than one grid at a time upwardly out of the magazine, means for adjustably mounting said top stops, and means for adjusting said rails longitudinally.

13. In combination, a carrier comprising a pair of parallel endless elements moving at the same speed, lands arranged on said elements in transverse alignment leaving notches therebetween, said lands being adapted to receive the lugs of grids with the grids proper hanging down between the said endless elements, and means for engagement with each grid as it passes, whereby the movement of each grid is interrupted until the next pair of notches advances to receive the grid.

14. In combination, an endless carrier comprising a pair of spaced endless chains moving at the same speed, said chains having oppositely arranged notches therein separated by lands, means for depositing the lugs of grids upon said lands, the grids proper hanging downwardly between the chains, and a stop positioned above the carrier for engagement with each grid as it passes, whereby the movement of each grid is interrupted until the next pair of notches advances to receive the grid, the depth of engagement between the stop and the grid being less than the depth of the notches.

In testimony whereof, we hereunto affix our signatures.

CHARLES D. CARLETON.
ALFRED R. WILLARD.